Figure 10:
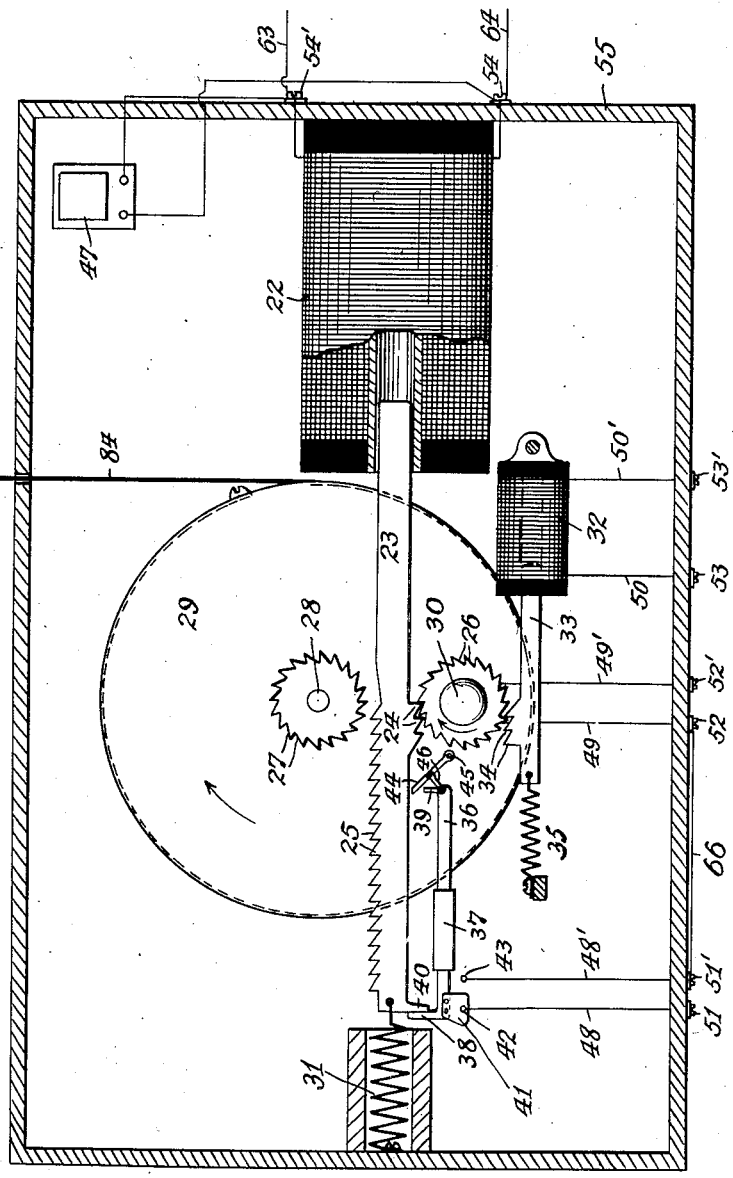

H. R. CEEVER.
AUTOMATIC CONTROL OF CINEMATOGRAPH OR SIMILAR APPARATUS.
APPLICATION FILED MAY 28, 1917.
1,366,310.
Patented Jan. 18, 1921.
3 SHEETS—SHEET 1.
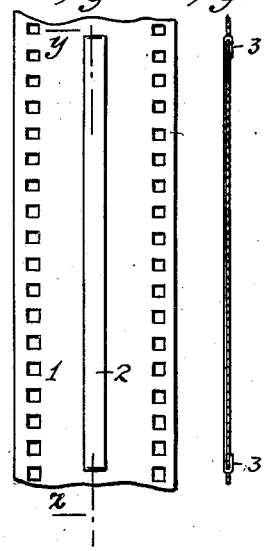
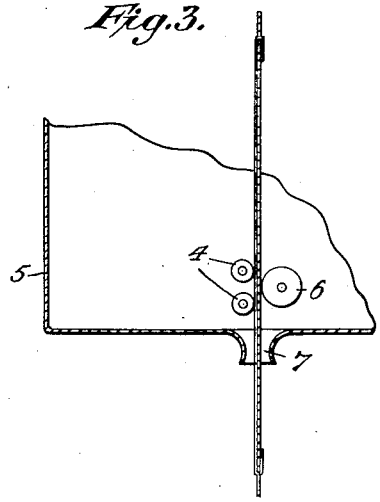
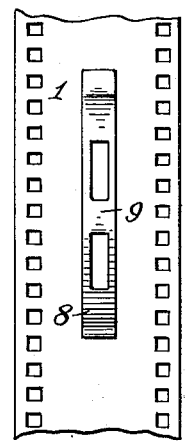
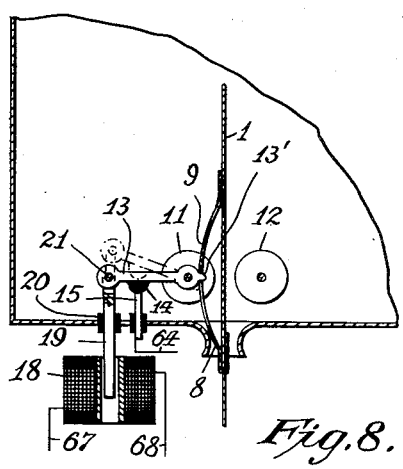
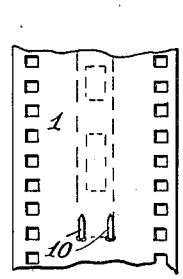
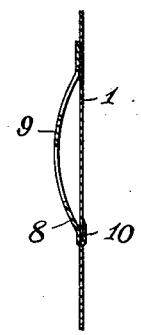
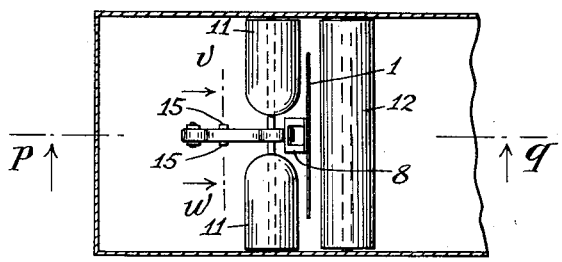
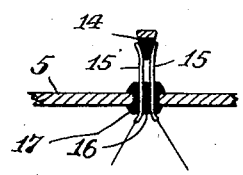
INVENTOR
Henry R. Ceever H. R. CEEVER.
AUTOMATIC CONTROL OF CINEMATOGRAPH OR SIMILAR APPARATUS.
APPLICATION FILED MAY 28, 1917.

1,366,310.

Patented Jan. 18, 1921.

H. R. CEEVER.
AUTOMATIC CONTROL OF CINEMATOGRAPH OR SIMILAR APPARATUS.
APPLICATION FILED MAY 28, 1917.
1,366,310.
Patented Jan. 18, 1921.
3 SHEETS—SHEET 3.
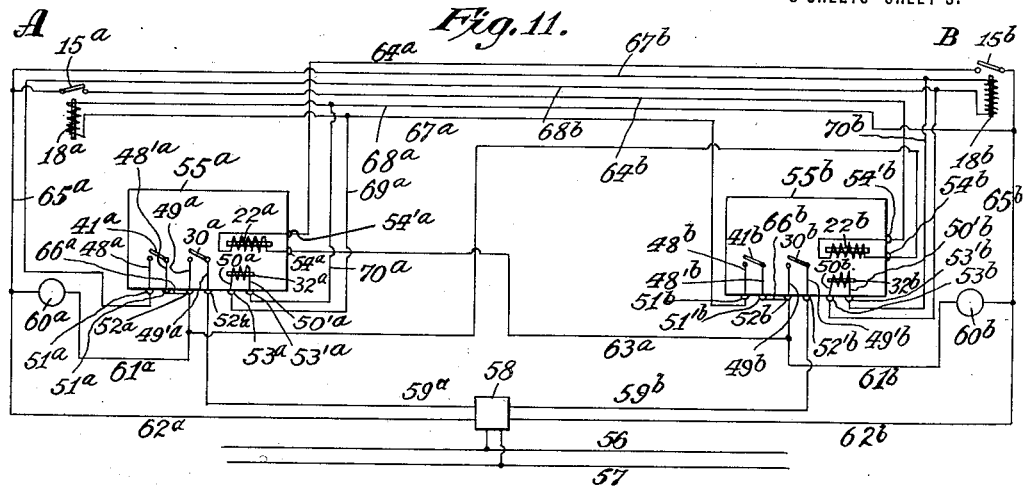
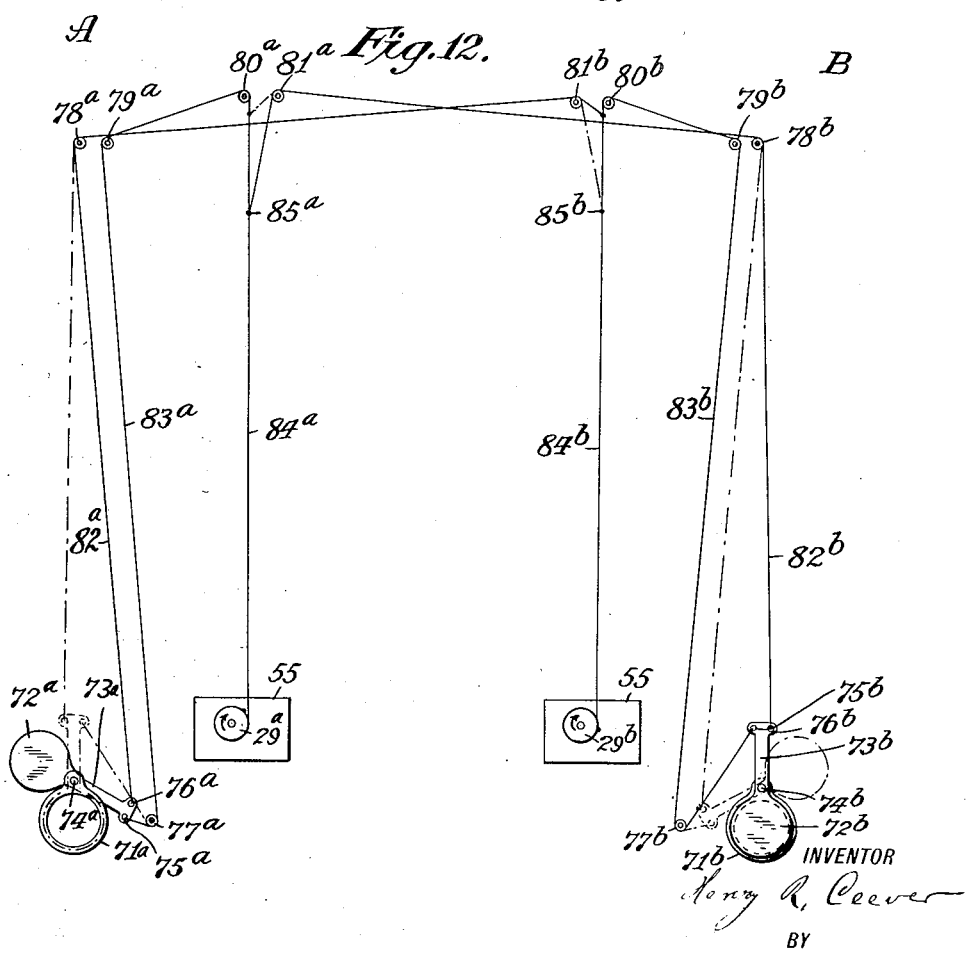
INVENTOR
BY
ATTORNEY

UNITED STATES PATENT OFFICE.

HENRY R. CEEVER, OF HOBOKEN, NEW JERSEY.

AUTOMATIC CONTROL OF CINEMATOGRAPH OR SIMILAR APPARATUS.

1,366,310.

Specification of Letters Patent.  Patented Jan. 18, 1921.

Application filed May 26, 1917. Serial No. 171,449.

*To all whom it may concern:*

Be it known that I, HENRY R. CEEVER, a subject of Russia, residing at Hoboken, in the county of Hudson and State of New Jersey, have invented certain new and useful Improvements in Automatic Control of Cinematograph or Similar Apparatus, of which the following is a specification.

This invention is concerned in particular with automatic control of the cutting in and cutting out operations for a plurality of cinematographs. The object in view is to provide a device adapted to perform automatically an important part of the duties of a moving picture operator under conditions arising in places, where two or more cinematographs are employed, one in succession of the other, so as to produce a continuous performance with the least possible interruption. The duties referred to concern the starting and stopping of such cinematographs at the right time, which requires both considerable attention and skill on the part of the operator. In cases where the succeeding film is to start with a continuation of a scene of the preceding one,—a frequent occurrence in plays extending over a number of reels,—and the impression of absolute continuity is very desirable, the automatic device described herein will accomplish this end with much more accuracy than even a skilled operator is able to attain.

As a supplementary accessory to this invention is provided an acoustic device sounding a signal at the moment a change of run from one cinematograph to another is being effected.

My object is attained, firstly, by providing means for controlling the cutting-in and cutting-out appliances of the cinematographs to be operated, said means consisting of a number of sets corresponding to the number of said cinematographs, each set having a member situated in a convenient part of one of the latter. Secondly, by providing each film to be used in this connection with a device adapted, at the moment of its passage with the former through one of said cinematographs to come in such contact with the said controlling means member situated therein, as to actuate the corresponding set of controlling means, thereby cutting out the cinematograph engaged in operation, and cutting-in another one to succeed it. This actuating device, of a size and nature as to offer no obstacle to its passage through a projector, may be either attached to the film, where desired, or may form a part in the construction of a portion of the same.

It will suffice in the following to confine the considerations to the case of two cinematographs, as in practice the use of more than two is very rare. Besides, the means for attaining the end in view for any number of cinematographs are in principle identical with those applied to a pair of such machines.

The means for controlling the cutting-in and cutting-out operations, described and illustrated in this specification, are in the form of a combination of mechanical with electro-magnetic devices, the latter serving as motive power for the movements of the former upon being energized by an electric current. The electro-magnetic as well as the mechanical apparatus may be of a variety of forms and modes of operation. For the former I prefer to use the solenoid with movable plunger, and for the most important part of the latter, the pawl and ratchet.

The device in combination with the film may likewise vary in form and mode of operation. Its function with respect to the solenoid, as described and illustrated hereinafter, is to close or affect an electric circuit containing one of them, at the moment of its passage through a cinematograph nearing the completion of its run. Two forms of such devices are dealt with in the following; preference, however, being given to one of them, so that the details in illustration and description will be more concerned with the form preferred.

As a source of electricity for energizing the electromagnetic apparatus, I prefer to use the currents of the motor circuits, so that the circuits containing the solenoids will be mainly in the form of shunts on the motor circuits.

In the accompanying drawings, which are made part of this application, Figures 1 and 2 illustrate one form of film attachment consisting of an electric conductor secured to a portion of film, Fig. 1 being the plan view, and Fig. 2 a cross section along the line *y—z* of Fig. 1. Fig. 3 shows the same portion of film with attachment at the moment of its passage through the upper firetrap between a pair of rollers forming terminals of an electric circuit on one side, and a guide roller on the other. Figs. 4, 5 and 6 illustrate a film attachment in the form of a catch secured to a portion of film, Fig. 4 being a plan view of the catch and film, Fig. 5 a plan view of the reverse side of it, and Fig. 6 a side elevation. Figs. 7 and 8 show the portion of film with the catch at the moment of their passage between two guide rollers and in front of a device having essentially the function of a switch, Fig. 8 being a plan view and Fig. 7 a cross section elevation along the line p—q. Fig. 9 is a cross section elevation of a part of Fig. 8 along the line v—w. Fig. 10 shows the details of one set of controlling means. Fig. 11 is a diagrammatic view of the electrical wiring inter-connecting two such sets with the motor circuits of a pair of cinematographs. Fig. 12 shows a diagrammatic view of a combination of strings or chains with pulleys, said strings or chains inter-connecting the lamp house shutters of a pair of cinematographs among themselves as well as with a member of each of the two sets of controlling means.

Referring to the drawings in which similar reference numerals designate corresponding parts throughout the several views, 1 denotes a portion of a film, 2 an attachment consisting of conducting material, like a strip of copper. 3, 3 are two end pieces passing through slits in the film and clamping the latter at those points. Fig. 3 shows a cross section of the lower left hand corner of the upper film chamber, 5 denotes the casing, 7 the firetrap, 4, 4 are two rollers insulated from each other and forming terminals of an electric circuit containing electromagnetic apparatus controlling a set of cutting-in and cutting-out appliances for a pair of cinematographs, 6 is a guide roller. The film 1 with the attachment 2 are shown at the moment of their passage between roller 6 on one side, and rollers 4, 4 on the other, the attachment coming in contact with the latter two, and closing the circuit containing said electromagnetic apparatus. In Figs. 4, 5 and 6, 1 denotes the film, 8 the catch consisting of a strip of springy material, bulging out on one side of the film. (This is only one of many possible forms of it, and shown in the drawing in a rather magnified size; in fact, the catch may be reduced to a small projection or prominence on the surface of the film). 10, 10 are two pointed extensions between which and the flat end-portion of the catch, the film is clamped. In Figs. 7 and 8 the catch is shown at the moment of its passage with the film between rollers 11 and 12; roller 11 is divided into two parts, as seen in Fig. 8; 13—13' denote a lever mounted between the two roller parts on a common axis with them; 14 is a wedge shaped piece of insulating material secured to the bottom part of lever arm 13; 15, 15 denote two springy blades or rods of conducting material, preferably copper, normally kept apart by the insulating wedge 14 and coming in contact with each other, when said wedge is removed; 16 denotes insulation between the two lower ends of said rods, 17 exterior insulation separating the same from the casing 5; 18 denotes a solenoid, 19 its plunger, 20 a bushing lining the hole in casing wall 5; at 21 the plunger is pivotally connected to lever arm 13.

At the moment the film portion passes between the rollers 11 and 12, bridge 9 (see Fig. 4) of the catch strikes lever tip 13' whereby arm 13 is thrust upward (as indicated by dotted lines) and insulating wedge 14 forced out from between the rods 15, 15; plunger 19 follows the upward movement of the lever. When solenoid 18 is energized by a current, plunger 19 and with it the lever and insulating wedge are forced back to their normal positions.

In Fig. 10, 22 denotes a solenoid, 23 its movable plunger, the extension of which forms a two-sided pawl, with teeth 24 adapted to engage ratchet 26 and teeth 25 adapted to engage ratchet 27; the latter is firmly secured to pulley 29, and both rotatably mounted on pivot 28; ratchet 26 is firmly secured to the knob of turnswitch 30 controlling one of the motor circuits; 31 denotes a retracting coil spring secured to plunger 23; 32 denotes another solenoid with a movable, spring retracted plunger 33, and extension of the latter with pawl teeth 34 adapted to engage ratchet 26 at the back stroke of the plunger. 36 denotes a bar adapted to slide back and forth in sleeve 37; 38 and 39 are projections or teeth at either end of said bar adapted to be engaged by tooth 40 of plunger 23 during the latter's travel back and forth. 42 and 43 denote terminals within a circuit containing solenoid 18 (see Fig. 7) 41 is a contact piece adapted to close said circuit, when in simultaneous contact with 42 and 43; 44 is an elastic rod pivoted at 45; 46 a flexible connector between said rod and the end piece of bar 36. 47 denotes an electromagnetic acoustic device the circuit of which forms a shunt on that of solenoid 22. 48, 48', 49, 49' and 50, 50' denote leads connecting respectively terminals 42, 43; turnswitch 30 and solenoid 32 to exterior terminal members 51, 51'; 52, 52' and 53, 53'; 54, 54' are exterior terminal members for solenoid 22; 55 denotes the casing within which the described parts are assembled.

When solenoid 22 is energized by a current, plunger 23 is drawn in, teeth 24 engage ratchet 26, whereby turnswitch 30 is operated. Near the end of this stroke, tooth 40 strikes tooth 39 causing bar 36 to follow the plunger through the remainder of the latter's travel, and contact piece 41 is brought into a position to connect terminals 42 and 43. At the same movement rod 44 is forced into a vertical position and firmly held in such by the end piece of bar 36; the pawl part of the plunger is by this means forced upward, (sufficient play being provided for in the solenoid) into such a position as to engage ratchet 26 during the back stroke of the plunger. This occurs when the current in solenoid 22 is cut off and spring 31 snaps back. At this stroke ratchet 28 makes one revolution, carrying pulley 29 with it, whereby a downward pull on string 84 is exerted. Before the end of the backstroke, tooth 40 strikes tooth 38, so that bar 36 with contact piece 41 is brought back to its normal position, terminals 42 and 43 are disconnected again and rod 44 is pulled back to its slanting position by connector 46 allowing also plunger 23 to return to its former position. In solenoid 32 the plunger 33 is kept in its normal position by coil spring 35, the latter yielding sufficiently at the movement of the former to permit pawl-teeth 34 to slide by ratchet 26,—work being done only at the back stroke, when the teeth engage the ratchet, thereby operating turn-switch 30. As will be seen later, the action of solenoid 32 with respect to turnswitch 30 is in opposite sense to that of solenoid 22: while the operation of the latter is to close the circuit controlled by switch 30, the operation of the former is to break it.

Figs. 11 and 12 showing a relation of parts and connections with respect to a pair of cinematographs are symmetrical in construction, since the parts in combination with each of the two cinematographs, as well as their connections, are similar. In the following, the corresponding parts of the sides "A" and "B" of said figures will be designated with similar numerals, but where distinction is required, the numerals will be accompanied by the letter of their respective side.

In Fig. 11 rectangle 55, on either side, incloses a diagrammatic representation of the electromagnetic apparatus contained in casing 55 of Fig. 10. $60^a$ and $60^b$ denote separate motor drives for each of the two cinematographs respectively, which are supposed to be controlled by said electromagnetic apparatus. The motor circuit on either side is formed by positive wire 59, terminal member 52′ lead 49′, turnswitch 30, lead 49, terminal member 52, wire 61, motor 60, and return wire 62. 58 denotes the compensator customary in operating room wiring. 56 and 57 are the feed wires to which the compensator is connected. The circuit of solenoid $22^a$ forms a shunt on motor circuit B through positive wire $63^a$ terminal member $54^a$, solenoid $22^a$, terminal member $54'^a$, return wire $64^a$, switch $15^b$ (see Fig. 8 terminal rods 15, 15) and wire 65. Conversely a shunt on motorcircuit "A" through its corresponding connections is controlled by switch $15^a$. The circuit of solenoid $18^a$ (see Fig. 8) forms another shunt on motorcircuit "B" from terminal member $52^b$ through positive wire 66 (see Fig. 10) terminal member 51′, lead 48′, switch $41^b$ (see Fig. 10, contact piece 41) lead 48, terminal member 51 wire $67^a$ solenoid $18^a$ and return wire $68^a$. Conversely the circuit of solenoid $18^b$ forms a shunt on motorcircuit "A" through corresponding connections and is controlled by switch $41^a$. The circuit of solenoid $32^a$ forms a shunt on the circuit of solenoid $18^a$ through positive wire $69^a$ terminal member $53^a$, lead $50^a$, solenoid $32^a$, lead $50^a$, terminal member $53^a$ and return wire $70^a$,—being also controlled by switch $41^b$. Similarly solenoid $32^b$ forms a shunt on the circuit of solenoid $18^b$, being, with the latter, controlled by switch $41^a$.

In Fig. 12, as in Fig. 11, the casing containing the apparatus illustrated in Fig. 10, is represented by a rectangle on either side of the figure. Only the pulley 29 having direct connection with the parts of this figure is shown within the rectangles "A" and "B". The plane of the latter is here assumed to be the front wall (i. e., the wall, through which the projection is taking place) of the operating room, whereto the casings containing the control apparatus are most conveniently secured. The rim 71 of a lamphouse tunnel is shown on one side indicating the connection of the dowsers with the lamphouses. 72 denotes the dowser, or lamphouse shutter on either side of the figure, 73 the dowser handle. At 74 the dowser is rotatably mounted on a pivot in the usual manner. 78 and 79 denote guide pulleys secured to the ceiling, vertically above the dowser; 80 and 81 are such pulleys secured, preferably to the ceiling, next to the wall. 77 denotes a guide pulley firmly secured in a position near the lamphouse tunnel, in the same plane as the dowser. String or chain $83^a$ connected at $75^a$ to dowser handle $73^a$ runs over pulley $77^a$ vertically up to pulley $79^a$, over the latter across the ceiling to pulley $80^a$ and over this down to $85^a$ connecting with string $84^a$, the other end of which is wrapped around control pulley $29^a$. String $82^a$, connected at $76^a$ to dowser handle $73^a$ runs vertically up to the ceiling, and over pulley $78^a$ across the ceiling to pulley $81^b$ and over the latter to $85^b$ connecting with string $84^b$, the other end of which is wrapped around control pulley $29^b$. It will be seen that string $84^a$ serves as a common end piece for $83^a$ and $82^b$, while $84^b$ is the common end piece for $83^b$ and $82^a$.

As shown in the drawing, dowser $72^a$ is in the open position, while $72^b$ is closed. When pulley $29^b$ is caused to rotate in the direction indicated by the arrow, a pull is exerted on strings 82ª and 83ᵇ through the medium of string 84ᵇ. This will cause the dowsers to rotate so, as to change their respective positions, namely: 72ª will go down to the closed position while 72ᵇ will open. This change in position of dowsers and strings is indicated in the drawing by dotted lines. In a similar way, a rotation of pulley 29ª in a clockwise direction will bring the dowsers from this latter position back to the former one.

*General description of the control apparatus and its action.*

In the following it will be assumed that two cinematographs "A" and "B" with separate motor drives and lamphouses are to be operated alternately and that, at the given moment, "A" is in operation, while "B" with its film ready in position, is to succeed it. It is also assumed that the film in "A" is provided with an attachment in the form of a catch (see Figs. 4, 5, 6). For the usual purposes the proper place for the attachment is near the tail end of the film.

As described above, when bridge 9 of the catch, at the moment of the latter's passage between the rollers 11ª and 12ª, strikes lever tip 13' (see Fig. 7), insulating wedge 14ª is forced out from between the terminal rods 15ª, 15ª, closing the shunt circuit (on motor circuit "A"), containing solenoid 22ᵇ, whereby the latter becomes energized. Pawl part 24ᵇ of plunger 23ᵇ closes, at the latter's movement, motor control switch 30ᵇ bringing motor 60ᵇ and with it projector of side "B" into action, leaving, however, lamphouse shutter 72ᵇ (Fig. 12) still closed. Near the end of this stroke tooth 40ᵇ strikes tooth 39ᵇ causing contact piece 41ᵇ to close the shunt circuit (on motor circuit "B") containing solenoid 18ª, whereby the latter becomes energized and plunger 19ª drawn in forcing lever arm 13ª with insulating wedge 14ª back to its former position breaking the circuit of solenoid 22ᵇ. This permits the back stroke of plunger 23ᵇ, whereby pulley 29ᵇ is caused to rotate and draw string or chain 84ᵇ with it, which brings lamphouse shutter 72ᵇ into the open position, while the one on side "A" is closed. Near the end of this stroke tooth 40ᵇ strikes tooth 38ᵇ, bringing contact piece 41 back to its former position. The circuit of solenoid 18ª is thus broken leaving the latter in its normal de-energized condition. The change of run from the cinematograph of side "A" to that of side "B" is now completed. It remains to cut motor 60ª out of circuit. This is done by solenoid 32ª, the circuit of which forms a shunt on the circuit of solenoid 18ª and is with the latter controlled by switch 41ᵇ. As described above, the pawl part 34ª of the plunger operates to turn switch 30ª at the back stroke. Motor 60ª is thus cut out of circuit after the dowsers have been shifted. The function of the solenoid 32 is only of secondary importance as there is ample time to stop the motor after the light has been cut out from the lamphouse.

In the case of a common motor drive for the two or more cinematographs, the principle involved is the same, though the controlling means would vary in form considerably from those described above.

All the matter contained in the above description as well as in the accompanying drawings, is intended only as an illustration representing one of many possible embodiments of this invention, and is not to be interpreted in a limiting sense.

What I claim is:

1. In a motion picture projecting apparatus, the combination of a plurality of projectors adapted to operate successively, driving means for operating the same, means for controlling the operation of said driving means, an actuating device carried by a film at a given point, and adapted by its passage through a projector with the film at a given moment to actuate the said controlling device whereby the projector is cut out and another brought into operation to succeed it.

2. In a motion picture projecting apparatus, the combination of two power driven projectors adapted to operate alternately, means controlling the starting and stopping of each projector, films in the projectors carrying actuating devices at a given point adapted at a given moment in their passage with the film in one of the projectors to actuate the said controlling means whereby that apparatus is cut out and the other brought into operation.

3. In a motion picture projecting apparatus, the combination of a plurality of projectors, adapted to operate successively, motor drive for said projectors, electric circuits including the motor drive and means for cutting in or out said motors in the order of succession in their work, said means comprising terminals conveniently located in the projector and electro-magnetic controlling mechanism, films in each projector carrying actuating devices at predetermined points which at a given moment in their passage with the film through one projector effect an electrical connection between said terminals whereby such projector is cut out and another brought into operation.

4. In a motion picture projecting apparatus, the combination of a plurality of projectors adapted to operate successively, motor drives therefor, means for controlling the operation of said motors, films in each projector, and a projection or prominence at a predetermined point on the surface of the film serving as a catch and adapted by the movement of the film to be brought in operative engagement with the said controlling means and to thereby cut out that projector and bring another into operation.

5. In a moving picture projecting apparatus, the combination of a plurality of projectors adapted to operate successively, motor drives therefor, a source of electricity and circuits for operating the motors, means for cutting in and cutting out the motors in proper order of succession, comprising terminals in a convenient part of the apparatus, and electro-magnetic controlling mechanism, films in the projectors, each carrying an actuating device at a predetermined point, and adapted at a given moment with its passage through a projector with the film to engage and operate the circuit controlling means located in the projector energizing the same and thereby throwing said projector out of operation and bringing another into operation.

6. In a moving picture projection outfit two cinematographs, operable alternately, one in succession of the other; a source of electricity; a motor drive for each of said cinematographs; a turn switch in each motor drive circuit; a lamphouse for each cinematograph; a lamphouse shutter or dowser rotatably mounted on a pivot and adapted to be manipulated by a handle, in each lamphouse tunnel; a combination of strings or chains running over guide pulleys and interconnecting said lamphouse shutter handles with two control pulleys, each of the latter being adapted, when rotated, to cause a simultaneous change in the positions of said lamphouse shutters with respect to their lamphouse tunnels; each of said cinematographs in combination with two shunt circuits on its motor drive circuit; one of said shunts having a switch situated in a convenient part of its cinematograph and containing a control solenoid, the second shunt containing a solenoid adapted, when energized, to open the switch of the first shunt and having a switch operable by the solenoid contained in said first shunt; films in said cinematographs, each film in combination with a device in the form of a catch attached thereto, where desired, and adapted, at the moment of its passage with the latter, through one of said cinematographs, momentarily engaged in operation, to engage and close the shunt switch situated therein, whereby the corresponding control solenoid is energized, the plunger of the same at its down stroke causing the motor switch of the other cinematograph to be closed, and, near the end of the stroke, closing also the switch in the second shunt, thereby energizing the solenoid contained in the latter, the latter opening the switch in the first shunt, deenergizing the control solenoid and allowing its spring retracted plunger to snap back, thereby imparting a rotation to one of the said control pulleys causing the lamphouse shutter of the still running cinematograph to be closed and the one of the other cinematograph to be opened, thus completing a change of run from the one cinematograph to the other.

7. In a moving picture projection outfit a plurality of cinematographs, operable successively, one after another; motor drives for said cinematographs; means for cutting in and cutting out said cinematographs in the order of succession in their work; means controlling said cutting-in and cutting-out means; films in said cinematographs, each film in combination with a projection attached thereto, where desired and adapted, at the moment of its passage through one of said cinematographs to actuate or affect said controlling means, whereby such cinematograph engaged in operation is cut out of action, while another one is cut in to succeed it; and an acoustic device adapted to be actuated by the aforesaid device, attached to the film, simultaneously with the said cut-in and cut-out controlling means, thus sounding a signal at the moment a change of run from one cinematograph to another is being effected.

8. In a cinematograph, the combination with devices adapted to serve as accessories thereto, of means for controlling said accessories, a film in said cinematograph provided with a projection constituting an actuating device which is adapted to transmit the inertia created by the movement of the film when passing through the operative parts of the cinematograph to mechanically actuate said controlling means, thereby bringing said accessories into action.

9. In a motion picture projecting apparatus, the combination with a plurality of cinematographs of a film in one of the same having a device attached thereto at a given point, a starting mechanism for said cinematographs and means for operating the same adapted to be engaged and operated by the passage of said device on the film to bring into action another cinematograph, as set forth.

In testimony whereof I have signed my name to this specification.

HENRY R. CEEVER.

Witness:
WILLIAM KERSTING,